United States Patent
Gandham et al.

(10) Patent No.: US 9,574,040 B2
(45) Date of Patent: Feb. 21, 2017

(54) DISENTANGLED ULTRA HIGH MOLECULAR WEIGHT POLYETHYLENE GRAFT CO-POLYMERS AND A PROCESS FOR PREPARATION THEREOF

(71) Applicant: RELIANCE INDUSTRIES LIMITED, Mumbai, Maharashtra (IN)

(72) Inventors: Satya Srinivasa Rao Gandham, Vadodara (IN); Ajit Behari Mathur, Vadodara (IN); Uma Sankar Satpathy, Vadodara (IN); Krishna Renganath Sarma, Vadodara (IN); Raksh Vir Jasra, Vadodara (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 0 days.

(21) Appl. No.: 14/427,263

(22) PCT Filed: Sep. 10, 2013

(86) PCT No.: PCT/IN2013/000547
§ 371 (c)(1),
(2) Date: Mar. 10, 2015

(87) PCT Pub. No.: WO2014/045303
PCT Pub. Date: Mar. 27, 2014

(65) Prior Publication Data
US 2015/0240017 A1    Aug. 27, 2015

(30) Foreign Application Priority Data
Sep. 10, 2012 (IN) .......................... 2616/MUM/2012

(51) Int. Cl.
C08F 255/02 (2006.01)
C08F 255/10 (2006.01)
C08F 255/08 (2006.01)

(52) U.S. Cl.
CPC .......... *C08F 255/10* (2013.01); *C08F 255/02* (2013.01); *C08F 255/08* (2013.01)

(58) Field of Classification Search
CPC ........................... C08F 255/02; C08F 255/10

USPC ........ 525/242, 243, 263, 298, 301, 302, 309
See application file for complete search history.

(56) References Cited

U.S. PATENT DOCUMENTS

| | | |
|---|---|---|
| 5,962,598 A | 10/1999 | Mack et al. |
| 7,803,873 B2 | 9/2010 | Wagman |
| 2005/0121825 A1 | 6/2005 | Rastogi et al. |

FOREIGN PATENT DOCUMENTS

| | | |
|---|---|---|
| CN | 1687165 A | 10/2005 |
| CN | 1948380 A | 4/2007 |
| CN | 1958274 A | 5/2007 |
| IN | 2862/MUM/2011 | 10/2011 |
| IN | 361/MUM/2012 | 2/2012 |
| JP | 2007153945 A | 6/2007 |
| WO | WO95/16718 | * 6/1995 |
| WO | WO-95/16718 A1 | 6/1995 |

OTHER PUBLICATIONS https://en.wikipedia.org/wiki/Ultra-high-molecular-weight_polyethylene; 2016.*
WO95/16718, machine translation, Jun. 1995.*
International Search Report for PCT/IN2013/000547 (in English), mailed May 8, 2014; ISA/CN.

* cited by examiner

*Primary Examiner* — Roberto Rabago
(74) *Attorney, Agent, or Firm* — Harness, Dickey & Pierce, P.L.C.

(57) ABSTRACT

In accordance with the present disclosure, there is provided a solid state graft copolymerization process for the preparation of disentangled ultrahigh molecular weight polyethylene graft copolymers in which disentangled ultrahigh molecular weight polyethylene is admixed with at least one functional monomer and a free radical initiator to obtain a mixture; and the mixture thus obtained is subjected to solid state polymerization to obtain a graft copolymer of disentangled ultrahigh molecular weight polyethylene. The graft copolymers of disentangled ultrahigh molecular weight polyethylene shows better crystallization temperature that ranges between 117° C. to 121° C. and improved decomposition temperature ($T_{100}$) that ranges between 460° C. to 480° C.

14 Claims, 5 Drawing Sheets

(a)

(b)

(a)

(b)

(c)

(a)

(b)

(c)

Figure 1:
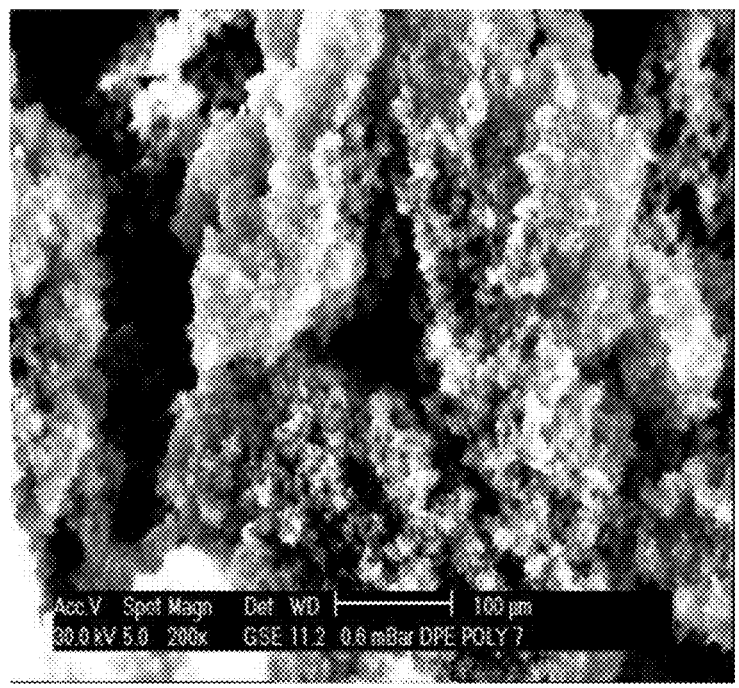
Figure 1:
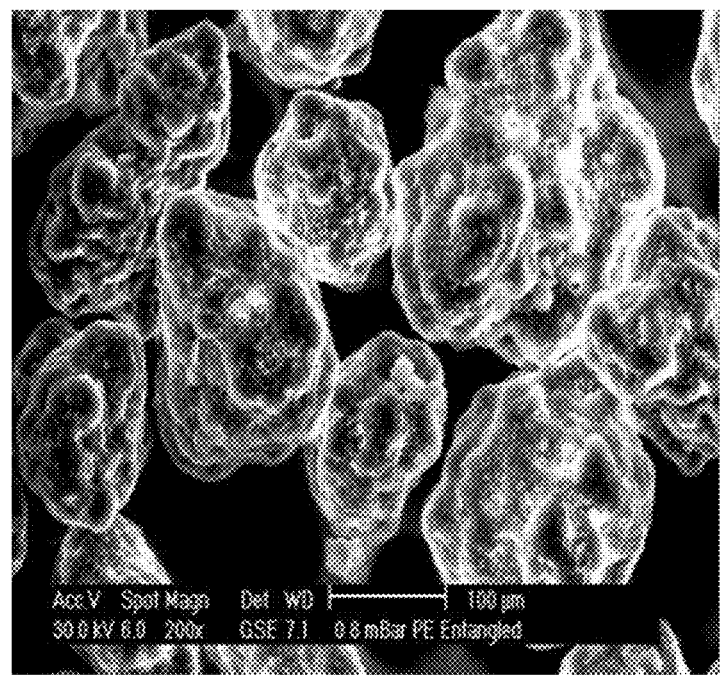

DISENTANGLED ULTRA HIGH MOLECULAR WEIGHT POLYETHYLENE GRAFT CO-POLYMERS AND A PROCESS FOR PREPARATION THEREOF

FIELD OF THE DISCLOSURE

The present disclosure relates to disentangled ultrahigh molecular weight polyethylene graft copolymers and a process for preparation thereof.

BACKGROUND

In light of the scarcity of new starting materials required, for the synthesis of new monomer molecules to deliver better polymer material, improvements and modifications in the existing polymers to meet the demand for new polymeric materials is the utmost requirement of the polymer technology. Further to fulfilling the demand for new polymeric materials, polymer modifications are also required to balance existing polymer properties. Cross-linking, copolymerization, polymer blending and polymer-composites are the few examples that are usually practiced to modify polymer properties.

EXISTING KNOWLEDGE

There are plenty of records pertaining to the graft co-polymerization of polyethylene to produce polyethylene graft copolymers having enhanced properties. Among the graft co-polymerization techniques, melt and solution polymerizations are well established processes.

U.S. Pat. No. 5,962,598 discloses a process to produce films by melt extruding a linear polymer at a temperature of 80° C., in the presence of a free radical initiator sufficient to produce bubble stability. The formation of an undesirable gel is also reported in this process.

Further, U.S. Pat. No. 7,803,873 discloses a solution grafting method for grafting phenolic ester monomers on the surface of polyolefin backbone in the presence of a free radical initiator. The grafted copolymer provides improved adhesion properties, particularly, to metal and polyester substrate. Further to melt and solution polymerization techniques, the modification carried out by using high energy radiations such as X-rays, γ-rays and e-rays in the presence of air, ozone, and UV radiation along with free radical accelerator have also been reported.

Further to above described techniques for polymerization, PCT Publication Number WO9516718 discloses a process for manufacturing functionalized olefinic homo- and copo-lymers with set level of cross-linking by radical solid phase graft polymerization technique in which α,β-ethylenically unsaturated compounds with functional groups such as mono- and di-carboxylic acids or their anhydrides, epoxides and hydroxides, amines, amides and imides, alone or mixed with addition monomers such as monovinylaromates, acrylates or methacrylates and monovinylesters, and backbone polymers or elastomers based on completely or predominantly olefin units, having different degree of branching in the range of 0 to 400 $CH_3$ end groups per 1000 carbon atoms, and with an average molar mass in the range of $5 \times 10^3$ to $5 \times 10^6$ g/mol are copolymerized. The process as disclosed in WO9516718 predominantly adapts a methodology to control the gel contents, via controlling the degree of cross-linking, while preparing the grafted copolymers of polyolefins.

Japan Patent Publication No 2007153945 discloses a process to graft acrylic monomeric moieties on the surface of ultrahigh molecular weight polyethylene by using a photo-graft polymerization technique to modify the surface of the polymer which is further bonded to a vinyl adhesive.

Another patent document CN1948380 discloses a process for manufacturing ultrahigh molecular weight polyethylene composite material possessing high binding ability. The graft co-polymerization is carried out by putting together the polyethylene, interface agent, grafting agent, dispersing agent, co-monomer and a free radical initiator into a ball-mill and reacting at a temperature of 60° C. to 130° C. for a time period of 0.5 to 5.0 hrs to obtain a graft copolymer. The process as disclosed in aforementioned Chinese patent document is preferably carried out by using less amount of solvent as compared to the conventional processes.

The prior-art methods of graft copolymerization either involves the melting of polymer above its melting point or using a solvent to swell the polymer or using very high energy radiations. The prior-art processes of melt or solution polymerization are allied with major drawbacks that can be identified as follows: (i) use of costly and hazardous solvent; and (ii) high temperature conditions which further deactivates the polymerization rate. In order to provide a solution for above identified problems; a solid state graft co-polymerization is adapted wherein the use of costly and hazardous solvents, or the high temperature conditions are obviated.

Therefore, there is felt a need to envisage a process to modify or enhance the thermal and nucleating properties of disentangled ultrahigh molecular weight polyethylene by using a solid state graft co-polymerization technique wherein the use of costly and hazardous solvents or the condition of high melting temperature is completely avoided.

OBJECTS

Some of the objects of the present disclosure are described hereinbelow:

It is an object of the present disclosure to ameliorate one or more problems of the prior art or to at least provide a useful alternative.

Another object of the present disclosure is to provide graft copolymers of disentangled ultrahigh molecular weight polyethylene having enhanced thermal stability and excellent nucleating efficiency.

Still another object of the present disclosure is to provide graft copolymers of disentangled ultrahigh molecular weight polyethylene having improved rheological properties.

A yet another object of the present disclosure is to provide a process for preparing graft copolymers of disentangled ultrahigh molecular weight polyethylene by using solid state graft co-polymerization process.

Further object Of the present disclosure is to provide an economical and environmentally safe process for preparing graft copolymers of disentangled ultrahigh molecular weight polyethylene wherein the use of costly and hazardous solvents, and high temperature conditions are completely obviated.

Other objects and advantages of the present invention will be more apparent from the following description when read in conjunction with the accompanying figures, which are not intended to limit the scope of the present invention.

Definition

The term "disentangled ultrahigh molecular weight polyethylene" (herein after refer to as DPE) used in the context of the present disclosure refers to a homo-polymer or copolymer of ethylene having molar mass in the range of 3 million to 15 million, wherein the polyethylene chains have low entanglement or are completely disentangled.

The term "Solid state graft co-polymerization" as used in the context of the present disclosure refers to a process wherein the co-polymerization of disentangled ultrahigh molecular weight polyethylene and functionalized monomer is accomplished under solvent free conditions, below the melting point of disentangled ultrahigh molecular weight polyethylene.

The term "Brabender Plasticorder" as used in the process of the present disclosure refer to a blending machine used to carry out solid state modifications below the melting point of the polymer for the required time, temperature and rpm, under shear using screws moving in co-rotation direction for homogeneous mixing.

The term "full decomposition temperature $(T_{100})$" as used in the context of the present disclosure refers to a temperature or a temperature range at which the substance is fully decomposed.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

SUMMARY

In accordance with the present disclosure, there is provided a process for preparing disentangled ultrahigh molecular weight polyethylene graft copolymers, said process comprising the following steps;
 i. admixing disentangled ultrahigh molecular weight polyethylene, at least one functional monomer and a free radical initiator to obtain a mixture; and
 ii. Subjecting the mixture to solid state polymerization to obtain a graft copolymer of disentangled ultrahigh molecular weight polyethylene.

Typically, the disentangled ultrahigh molecular weight polyethylene is a homo-polymer of ethylene or a copolymer of ethylene with other alpha-olefin monomers that comprises at least one alpha-olefin monomer selected from the group consisting of 1-butene, 1-hexene and 1-octene.

Typically, the disentangled ultrahigh molecular weight polyethylene is used in the form of a powder with an average particle size varying between 220 to 450 micron, having a molar mass ranging between 3 million to 15 million; bulk density ranging between 0.0485 to 0.07 g/cc, and a density of 0.965 g/cc.

Typically, the functional monomer is an acrylic and/or anhydride based monomer selected from the group of compounds consisting of pentaerythritol triacrylate, trimethylolpropane triacrylate, methyl methacrylate, acrylic acid, maleic anhydride and any combinations thereof.

Typically, the weight proportion of monomer varies between 0.25 wt % to 30 wt %, preferably between 2.5 wt % to 20 wt %, with respect to the total mass of disentangled ultrahigh molecular weight polyethylene.

Typically, the free radical initiator is at least one selected from the group of compounds consisting of dicumyl peroxide, 2,5-dimethyl-2,5-di(tert-butylperoxy)hexane and diacetyl peroxy dicarbonate.

Typically, the amount of free radical initiator varies between 0.5 to 500 ppm, preferably from 0.2 ppm to 200 ppm.

Typically, the solid state polymerization is carried out in the mixing head of a blending machine under shear in between screws with the screw rpm of less than 30, for a time period ranging between 5 min to 150 minutes.

Typically, the mixture is heated to a temperature ranging between 30° C. to 150° C., preferable between 40° C. to 140° C.

Typically, the graft copolymers are obtained in the form of fibers and flakes.

In another aspect of the present disclosure, there is provided graft copolymers of disentangled ultrahigh molecular weight polyethylene, said copolymers comprising disentangled ultra high molecular weight polyethylene in an amount ranging between 70 wt % to 99.75 wt % and functional monomers grafted onto the backbone of the disentangled ultra high molecular weight polyethylene in an amount ranging between 0.25 wt % to 30 wt %; said graft co-polymers are characterized by a crystallization temperature of at least 117° C. and a decomposition temperature $(T_{100})$ ranging between 460° C. to 480° C.

Typically, the crystallization temperature ranges between 117° C. to 121° C.

Typically, the disentangled ultrahigh molecular weight polyethylene is a homo-polymer of ethylene or a copolymer of ethylene with other alpha-olefin monomers that comprises at least one alpha-olefin monomer selected from the group consisting of 1-butene, 1-hexene and 1-octene.

Typically, the disentangled ultrahigh molecular weight polyethylene is of high molecular weight ranging between 3 million to 15 million; bulk density ranging between 0.0485 to 0.07 g/cc, and a density of 0.965 g/cc.

Typically, the functional monomer is an acrylic and/or anhydride based monomer selected from the group of compounds consisting of pentaerythritol triacrylate, trimethylolpropane triacrylate, methyl methacrylate, acrylic acid, maleic anhydride and any combinations thereof.

BRIEF DESCRIPTION OF THE ACCOMPANYING DRAWINGS

Figure 2:
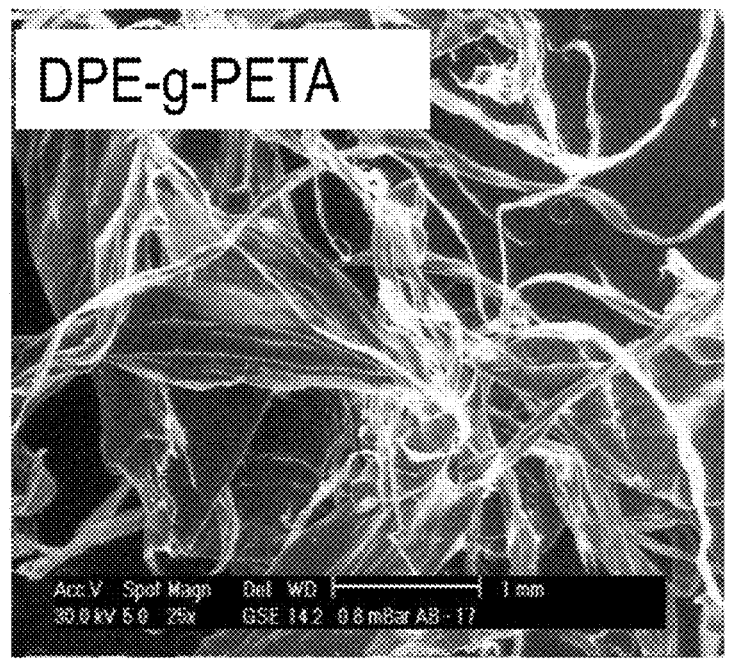
Figure 2:
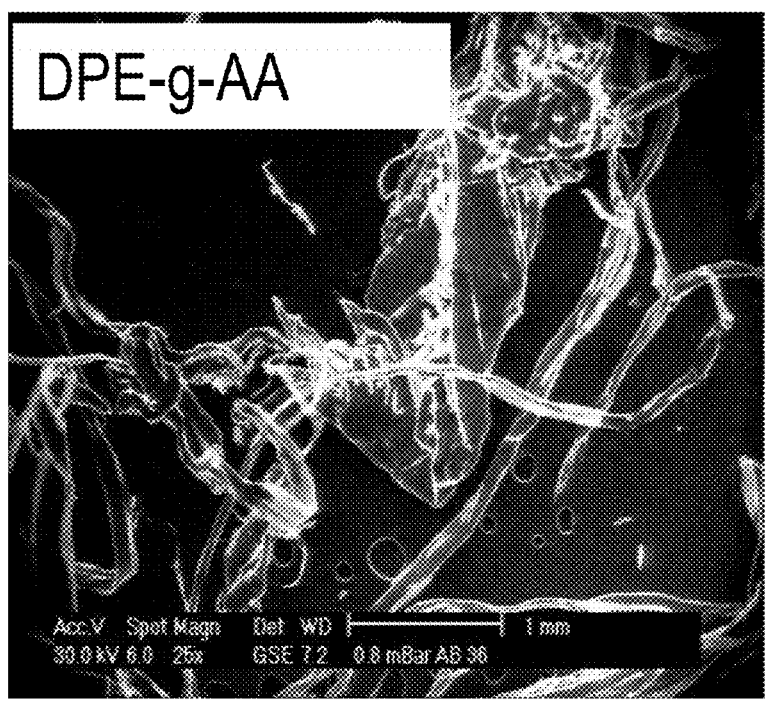
Figure 2:
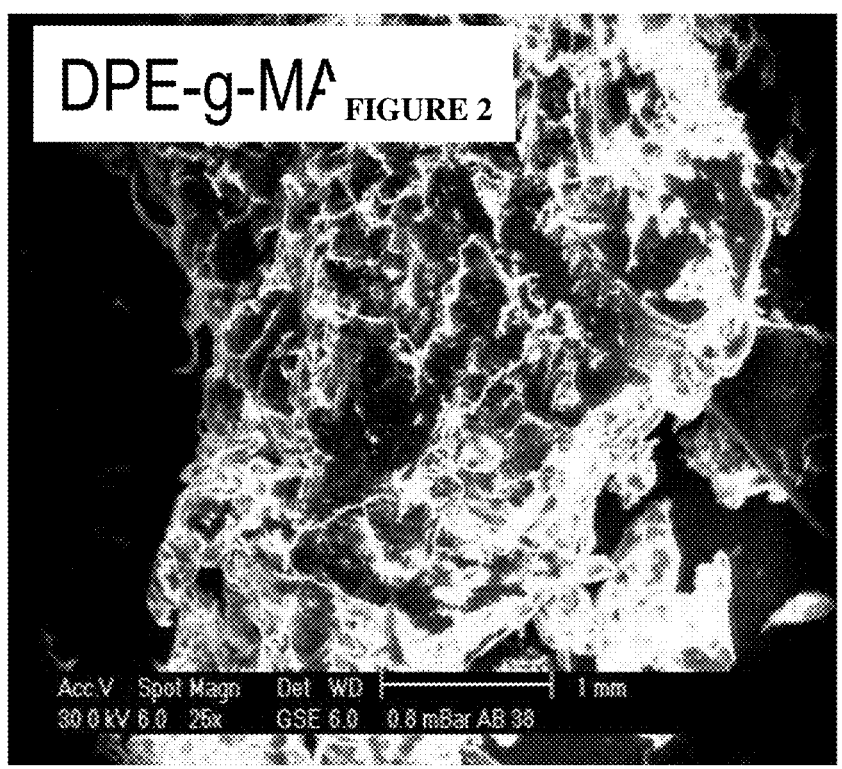

FIG. 1 of the accompanying drawings illustrates scanning electron micrographs of (a) virgin disentangled ultrahigh molecular weight polyethylene (DPE); and (b) entangled ultrahigh molecular weight polyethylene (EPE);

FIG. 2 of the accompanying drawings in accordance with the present disclosure illustrates scanning electron micrographs of disentangled ultrahigh molecular weight polyethylene grafted with (a) pentaerythritol triacrylate (DPE-g-PETA); (b) acrylic acid (DPE-g-AA); and (c) maleic anhydride (DPE-g-MA); and FIG. 3 of the accompanying drawings illustrates scanning electron micrographs of entangled ultrahigh molecular weight polyethylene grafted with (a) pentaerythritol triacrylate (FPE-g-PETA); (b) acrylic acid (EPE-g-AA); and (c) maleic anhydride (EPE-g-MA).

DETAILED DESCRIPTION

Polymer modifications via graft co-polymerization is a process to endow polymers with specific properties such as enhanced thermal stability, better nucleating efficiency, flexibility, compatibility and the like. Accordingly, there is provided in accordance with the present disclosure graft copolymers of disentangled ultrahigh molecular weight polyethylene (DPE) with enhanced thermal stability, better nucleating property and improved rheological features.

The enhanced thermal stability and better nucleating efficiency are endowed in the disentangled ultrahigh molecular weight polyethylene by reactive processing. The reactive processing of DPE comprises a method of grafting and polymerizing the functionalized monomers having acid, ester and/or anhydride functional groups onto the backbone of disentangled ultrahigh molecular weight polyethylene in the presence of a free radical initiator. The reactive processing of acrylic monomers onto DPE backbone is accomplished entirely in solid state condition with out using any solvent, below the melting point of DPE.

In accordance with a first aspect of the present disclosure, there is provided disentangled ultrahigh molecular weight polyethylene graft copolymers obtained by the solid state graft co-polymerization of disentangled ultrahigh molecular weight polyethylene and functional monomers selected from the group of compounds containing acid, ester or anhydride functional groups wherein the graft copolymers being characterized by a crystallization temperature of at least 117° C., and a decomposition temperature ($T_{100}$) ranging between 460° C. to 570° C.

The solid state graft co-polymerization process in accordance with the present disclosure comprises a method step of preparing a uniform reaction mixture containing disentangled ultrahigh molecular weight polyethylene, functionalized monomer and a free radical initiator, heating the mixture at a temperature below the melting point of disentangled polyethylene under shear to obtain disentangled ultrahigh molecular weight polyethylene graft copolymer.

The disentangled ultrahigh molecular weight polyethylene and a functionalized monomer are added in a container and mixed thoroughly with a stirrer at ambient temperature to obtain a uniform mixture in the form of a fine powder. A free radical initiator is then added in the container and stirred again till a uniform distribution of initiator and functionalized monomer is achieved.

The disentangled ultrahigh molecular weight polyethylene as used in the process of the present disclosure may be a homo-polymer or copolymer of ethylene with other alpha-olefin monomers.

In accordance with one of the preferred embodiment of the present disclosure, the alpha-olefin monomer is a $C_4$ to $C_8$ alpha-olefin that comprises at least one alpha-olefin monomer selected from the group consisting of 1-butene, 1-pentene, 1-hexene, 1-octene, and 1-decene. The preferred alpha-olefin monomer is 1-butene, 1-hexene and 1-octene. The weight proportion of alpha-olefin monomer typically varies between 0.1 wt % percent to 15.0 wt %, with respect to the total mass of the disentangled ultrahigh molecular weight ethylene copolymer.

The disentangled ultrahigh molecular weight polyethylene as used in the process of the present disclosure is of high molar mass ranging between 3 million to 15 million, as measured by using equation give in ASTM-D4020-18, low bulk density ranging between 0.0485 and 0.070, and with a density ranging between 0.925 to 0.965 g/cm³.

The inventors of the present disclosure preferably use disentangled ultrahigh molecular weight polyethylene in fine powder form having particle size ranging between 25 and 800 micron, preferably between 50 to 600 microns. The preferred particle size ranges between 200 and 450 micron.

The disentangled ultra high molecular weight polyethylene as employed in the process of the present disclosure may either be procured ready made or prepared by employing any conventional methods known in the art. In a particular preferred method, the DPE is prepared by employing a process as disclosed in our un-published co-pending Indian Patent Applications 2862/MUM/2011 and 361MUM2012, the details of which are incorporated herein in its entirety. In a preferred method, ethylene, either alone or mixed with at least one $C_3$ to $C_8$ alpha-olefin co-monomer, is polymerized in the presence of a phenoxyimine-Ti based single site catalyst. Alternatively, catalysts as disclosed in unpublished co-pending Indian Patent Application 361/MUM2012 are also employed. The polymerization is accomplished at a pressure typically ranging between 0.2 to 5 bars and temperature ranging between 10° to 50° C., preferably 40°-45° C. to provide ultra-high molecular weight polyethylene (UHMWPE) having molecular weight ranging between $3 \times 10^6$ to $15 \times 10^6$ and molecular weight distribution ranging between 1.2 and 15. Further, characteristic features of the ultra high molecular weight polyethylene as employed in the process of the present disclosure are as follows: Reduced Specific Viscosity ranges from 3.4 to 61 dl/g; bulk density from 0.045 to 0.30 g/cc, preferably from 0.048 to 0.07 g/cc; melting point ranging between 139° to 142° C.; ΔH of about >210 J/g; and crystallization temperature (Tc) of about 116° C. The polymer chains of UHMWPE are in a state of high level of disentanglement.

The functional monomer as used in the process of the present disclosure is selected from the group of compounds containing ester, acid, or anhydride functional groups. In accordance with one of the exemplary embodiments of the present disclosure, the functionalized monomer is an acrylic or anhydride based monomer that includes at least one monomer selected from the group consisting of acrylic acid, methyl methacrylate, pentaerythritol triacrylate, trimethylolpropane triacrylate, and maleic anhydride.

The weight proportion of functionalized monomer mixed with disentangled ultrahigh molecular weight polyethylene typically varies between 0.25 wt % to 30 wt %, preferably 2.5 wt % to 20 wt %, with respect to the weight of DPE. The preferred weight proportion varies between 2.5 wt % to 15 wt %

The free radical initiator used in the process of the present disclosure is at least one selected from the group of compounds consisting of dicumyl peroxide, 2,5-dimethyl-2,5-di(t-butylperoxy)hexane and diacetyl peroxy dicarbonate. The amount of free radical initiator is preferably kept below 500 ppm during the solid state graft co-polymerization process of the present disclosure. Typically, the amount of free radical initiator varies between 0.5 to 500 ppm, preferably between 0.2 to 200 ppm. The preferred range is 0.1 to 50 ppm.

The uniform reaction mixture containing disentangled ultrahigh molecular weight polyethylene, functional monomer and free radical initiator is then transferred to a mixing head of a blending machine. The Brabender Plasticorder is the most preferred blending machine for the purpose of the present disclosure. In the mixing head of the Brabender Plasticorder, the mixture is heated to a temperature below the melting point of disentangled ultrahigh molecular weight polyethylene and mixed under shear in between the screws. The screw rpm is typically maintained between 10 to 100 rpm, preferably between 10 rpm to 50 rpm. In a particular preferred embodiment, the screw rpm is less than 30. Further, various process parameters such as concentration of functionalized monomers and initiator, reaction time, and reaction temperature are also optimized to provide an improved yield of graft copolymers.

Typically, the temperature during the solid state graft co-polymerization is kept below 150° C., as the higher temperature condition may decompose the free radical initiator thereby adversely affecting the rate of reaction. In accordance with the one of the exemplary embodiment of the present disclosure, the solid state graft co-polymerization is carried out at a temperature varying between 30° C. to 150° C., preferably between 40° C. to 140° C. The preferred temperature range is between 60° C. to 100° C.

Usually, the nature and the amount of free radical initiator are the most decisive factors to evaluate the reaction time. As a general practice, the time required for solid state modification is kept higher than the initiator half-life so as to obtain graft copolymers in higher yields and leaving no or very little scope for residual peroxide. The peroxide residues are not very beneficial for the process, as it may trigger gel formation during subsequent processing. Typically, the reaction mixture is heated for a time period varying between 5 minutes to 150 minutes, preferably between 15 to 120 minutes. The preferred reaction time varies between 30 minutes to 60 minutes.

After heating the reaction mixture for a pre-determined period of time, graft copolymers of disentangled ultrahigh molecular weight polyethylene are obtained. The graft copolymers are obtained in the form of fibers and flakes which are further isolated by subjecting the reaction mixture to a soxhlet extraction using acetone, methanol and/or dichloromethane solvents. During soxhlet extraction, un-reacted monomer, initiator and, homo-polymers of functionalized monomers are removed.

The extracted DPE-graft-copolymers namely DPE-g-AA, DPE-g-MA, DPE-g-PETA, DPE-g-MMA, DPE-g-TEMPTA, obtained by the solid state graft co-polymerization process of the present disclosure are subjected to gravimetric and FT-IR spectroscopic analysis to confirm the incorporation of functionalized monomers onto the backbone of DPE. Further characterization is carried out by using Differential Scanning calorimetry, Thermogravemetric Analysis and Scanning Electron Microscopy to evaluate their thermal stability, nucleating efficiency and morphological features, respectively.

The graft copolymers of DPE with acrylic and/or anhydride based monomers prepared in accordance with the solid state graft co-polymerization process of the present disclosure show considerable improvement in their nucleating and thermal properties. However, the molecular weight of DPE remains unaltered during the co-polymerization process i.e. the DPE graft-copolymers show no reduction in the molecular weight of DPE.

The improvement in the nucleating characteristic of the disentangled ultrahigh molecular weight polyethylene graft copolymers are established by measuring their crystallization temperature and comparing with the crystallization temperature of virgin disentangled ultrahigh molecular weight polyethylene and ultrahigh molecular weight polyethylene (referred as disentangled ultrahigh molecular weight polyethylene i.e. DPE). The crystallization temperature of DPE graft-copolymers prepared in accordance with the process of the present disclosure achieves a maximum limit of 121° C. as compared to 116° C. temperature of virgin DPE. Further, the final decomposition temperature of the DPE graft copolymers increases to a temperature ranging between 460° C. to 570° C. when compared to 454° C. thermal decomposition temperature of virgin DPE.

The most advantageous aspect of the present disclosure lies in improving the thermal and nucleating properties of disentangled ultrahigh molecular weight polyethylene without affecting the molar mass of DPE and in-situ generation of DPE graft copolymers in the form of fiber/flakes by using solid state graft co-polymerization technique, wherein the process is accomplished entirely in solvent free conditions, below the melting point of disentangled ultrahigh molecular weight polyethylene. In addition, no cross-linking agent is used in the process of the present disclosure; therefore, the DPE graft copolymers are essentially free from any set level of cross-linking i.e. no gel formation is observed.

The in-situ generated fibers and flakes of DPE graft-copolymers of the present disclosure are further compression moulded into films and sheets below the melting point of the polymer. The graft copolymers are initially compressed at a low pressure of 10-100 kg/cm$^2$ for a minimum period of time, and then compressed at a high pressure of 350 kg/cm$^2$ for a pre-determined period of time, below the melting point of DPE. The compression time typically ranges between 30 min to 5 h. Typically, fused round, square or disc shaped articles of 0.1 mm to 3.0 mm size are obtained. The moulded articles are subjected to DSC characterization. The moulded articles retain their disentanglement nature upto or below 128° C. as indicated by very high heat of fusion values for graft copolymers but lost their disentanglement nature above this temperature and are converted into entangled polymer as indicated by lower heat of fusion.

The graft copolymers of DPE prepared in accordance with the process of the present disclosure are useful for the production of films and sheets, and are used as compatibilizers for various blends and composites.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Example-1

Solid State Graft Co-Polymerization of Disentangled Ultra-High Molecular Weight Polyethylene (Hereinafter Refer as DPE) with Pentaerythritol Triacrylate (PETA)

Pentaerythritol triacrylate (0.265 gm) was taken in a container and mixed with 5 gm of disentangled ultrahigh molecular weight polyethylene powder (DPE), synthesized in the laboratory, having a molecular weight of 5M, bulk density 0.055 and density 0.965. The DPE in fine powder form having an average particle size of 227 microns was used. Diacetyl peroxy dicarbonate initiator (5*10$^{-3}$ gm) was added to the reaction mixture and stirred for 10 minutes. The resultant reaction mixture was then transferred into a mixing head of Brabender Plasticorder and heated at a temperature of 100° C. for 60 minutes with a screw rpm of 20. After the completion of the reaction, the contents were transferred to a container and reweighed. The final contents were then subjected to soxhlet extraction for 6 hrs using acetone solvent to remove the un-reacted monomer, initiator and un-grafted homo-polymer. The extracted graft copolymer (abbreviated as DPE-g-PETA) was cooled and dried in a vacuum oven for 2 hrs at 80° C.

The solid state graft co-polymerization was also carried out by taking similar quantities of disentangled ultrahigh molecular weight polyethylene (DPE) and PETA monomer in a three necked round bottom flask equipped with a mechanical stirrer, condenser and a nitrogen inlet. The reaction was carried out at 100° C. for 60 minutes. Similarly, another set of reaction was also carried out under identical conditions in a sealed round bottom flask without stirring.

The extracted graft copolymers were subjected to Differential Scanning calorimetric (DSC), Thermo Gravimetric (TGA) and Scanning Electron Microscope analysis (SEM) to measure their nucleating efficiency, thermal stability and morphological properties. The nucleating efficiency and thermal stability of the DPE-g-PETA graft copolymer is tabulated in Table-1, 3 and 6. SEM analysis of DPE-g-PETA graft copolymer clearly indicates in-situ formation of strong fibers (refer to FIG. 2 of the accompanying drawings).

On the other hand, the products as obtained from the reaction carried out in the three necked round bottom flask, with or without stirring, show no change their morphology when compared with the morphology of virgin DPE. The un-altered morphology of DPE polymer indicates no reaction in the sealed round bottom flask.

Example-2

Solid State Graft Co-Polymerization of DPE, with Trimethylolpropane Triacrylate (TEMPTA)

Solid state graft co-polymerization of TEMPTA monomer onto the backbone of DPE to obtain grafted copolymer of DPE and TEMPTA (hereinafter refer as DPE-g-TEMPTA graft copolymer) and characterization thereof was carried out in the same manner as described in the process of Example 1, except PETA was replaced with TEMPTA in equal quantity. The nucleating efficiency and thermal stability data of the extracted DPE-g-TEMPTA graft copolymer is disclosed in Table-1 and Table-6.

Example 3

Solid State Graft Co-Polymerization of DPE with Methyl Methacrylate (MMA)

Solid state graft copolymerization of DPE with MMA was carried out in the same manner as described in the process of Example 1 under identical conditions except PETA was replaced with MMA in equal quantity. The extracted graft copolymer thus obtained (DPE-g-MMA) was subjected to further characterization. For nucleating efficiency and thermal stability data of DPE-g-MMA refer to Table-1 and 6.

Example 4

Solid State Graft Co-Polymerization of DPE with Acrylic Acid (AA)

Solid state graft co-polymerization of DPE with acrylic acid monomer was carried out in the same manner as described in the process of the Example 1 under identical conditions except PETA was replaced with AA in equal quantity. The extracted graft copolymer thus obtained (DPE-g-AA) was subjected to further characterization using FT-IR, DSC, TGA and SEM techniques. Refer to the data of Tables 1, 4 and 6 for the nucleating efficiency and thermal stability of DPE-g-AA graft copolymer.

Example 5

Solid State Graft Co-Polymerization of DPE with Mixed Acrylate Monomers

Solid state graft co-polymerization of DPE with mixed monomers were carried out in the same manner as described in the process of Example-1 except PETA was replaced with a mixture of PETA/TEMPTA or PETA/AA monomers, in equal quantity. Similar to the above described procedure of example-1, the graft copolymers obtained in accordance with the process of this example i.e. DPE-g-PETA/TEMPTA and DPE-g-PETA/AA were characterized. Data relevant to their thermal stability is tabulated in Table 6.

Example 6

Solid State Graft Co-Polymerization of DPE with Maleic Anhydride (MA)

Solid state graft co-polymerization of DPE with MA was carried out in the same manner, as described in the process of Example 1 under identical conditions except PETA was replaced with equal quantity of maleic anhydride (MA). The obtained graft co-copolymer i.e. DPE-g-MA was characterized by using FT-IR, DSC, TGA and SEM techniques. The nucleating efficiency and thermal stability data of DPE-g-MA graft copolymer is provided Tables 1 and 6.

Example 7

Solid State Graft Co-Polymerization of Disentangled Ultrahigh Molecular Weight Polyethylene-Hexene Copolymer (DPEH) with Pentaerythritol Triacrylate (PETA)

Solid state graft co-polymerization of DPEH with PETA monomers was carried out in the same manner as described in the process of Example-1 under identical conditions except DPE was replaced with disentangled ultrahigh molecular weight polyethylene-hexane copolymer (DPEH). The weight proportion of 1-hexene in DPEH varies between 0.1 to 10 wt. %. The graft copolymer (DPEH-g-PETA) was obtained in fiber form which is further characterized by using FT-IR, TGA, DSC and SEM techniques. The nucleating efficiency and thermal stability data is tabulated in Table-5 and 6.

The graft copolymers namely DPE-g-PETA, DPE-g-TEMPTA, DPE-g-MMA, DPE-g-AA, DPE-g-PETA/TEMPTA or DPE-g-PETA/AA, DPE-g-MA and DPEH-g-PETA obtained in accordance with the processes of example-1, 2, 3, 4, 5, 6 and 7, respectively were subjected to soxhlet extraction to remove residual free radical initiator, un-reacted monomer and homopolymer thereof. The grafted copolymers were kept in a cellulosic extraction thimble and extracted for 4-6 hrs by using different solvents such as acetone, methanol and dichloromethane. The extracted polymer was dried in a vacuum oven for 2 h at 80° C., thereafter the amount of graft copolymers was estimated gravimetrically. The extracted solvent was further dried to measure the amount of homopolymer and residual monomer present in the reaction mixture. Acetone was found to extract more homopolymer as compared to methanol and dichloromethane.

The extracted graft copolymers obtained in accordance with the processes of the present disclosure were subjected to characterization by using FT-IR, DSC, TGA and SEM.

The IR spectra of graft copolymers and virgin DPE were recorded by using KBR medium in the range of 400-4000 cm$^{-1}$ on Nicolet USA instrument. The presence of strong absorption bands corresponding to the ester carbonyl groups at 1733 cm$^{-1}$, 1731 cm$^{-1}$ and 1736 cm$^{-1}$ in case of DPE-g-PETA, DPE-g-MMA and DPE-g-TEMPTA graft copolymers confirms the incorporation of PETA, MMA and TEMPTA monomers on the backbone of DPE polymer, respectively. The presence of a strong absorption band at 1635 cm$^{-1}$ in case of DPE-g-AA graft copolymer confirms the incorporation AA monomers onto the backbone of DPE polymer. In case of DPE-g-MA graft copolymers, the presence of two strong absorption bands at 1640 cm$^{-1}$ and 1740 cm$^{-1}$ corresponding to the symmetrical and asymmetrical stretching vibrations of anhydride carbonyl groups confirms the incorporation of maleic anhydride monomer onto the backbone of DPE polymer.

The extracted graft copolymers obtained in accordance with the processes of example 1, 2, 3, 4, 5, 6, and 7 are further subjected to nucleation efficiency test by using Differential Scanning calorimeter. The efficiency of graft copolymers of the present disclosure as a nucleating agent was evaluated by measuring their Peak Crystallization Temperatures (Tc), Melting Temperatures (Tm), and super cooling $\Delta T$ ($\Delta T=Tm-Tc$) i.e. the difference between the melting temperature and crystallization temperature $\Delta T$. For this, the graft copolymer sample was heated at a temperature of 50° C. to 220° C. with a heating rate of 10° C./min, held for 5 min at 220° C., and then cooled with the same rate until it reached room temperature. During the gradual heating and cooling of samples, their Tc, Tm and heat of fusion were measured (nucleating efficiency data corresponding to DPE-graft copolymers and DPEH graft copolymers is tabulated in Table-1 and Table-5).

Peak Crystallization Temperature (Tc), Melting Temperature (Tm), and heat of fusion for virgin disentangled ultrahigh molecular weight polyethylene (DPE), virgin copolymer of disentangled ultrahigh molecular weight polyethylene with 1-hexene (DPEH) and entangled ultrahigh molecular weight polyethylene (EPE) were also measured and compared with the data of graft copolymers of the present disclosure. The nucleating efficiency data of virgin DPE, virgin DPEH and EPE polymer is tabulated in Tables 1 to 5 and 7, respectively.

The graft copolymers prepared in accordance with the process of the present disclosure show higher crystallization temperatures as compared to the virgin polymers. Among the graft copolymers obtained in accordance with the process of the present disclosure, crystallization temperature (Tc) of DPE-g-PETA copolymer increased to 121° C. as compared to virgin DPE which is 116° C. (refer to Table-1). The shift in Tc values for the EPE-graft copolymers was less as compared to DPE graft copolymers (refer to Table 7).

Thermo gravimetric analysis of graft copolymers were recorded on TGA Pyris 1 (M/s Perkin Elmer Limited) instrument from room temperature to 600° C. temperature with a heating rate of 10° C./min under nitrogen atmosphere. From the data as disclosed in Table-6, it can be clearly stated that all the extracted graft copolymers prepared in accordance with the process of the present disclosure show a single stage thermal decomposition with 100% decomposition at a temperature range of 460-500° C. However, the un-extracted graft copolymers, DPE-g-MA and mixed monomers show two stage and multistage decompositions All the graft copolymers of the present disclosure were found to be more stable than the virgin DPE polymer. The DPE graft copolymers also show higher stability than the EPE graft copolymers.

Morphology of virgin DPE, virgin DPEH, EPE and their graft copolymers was studied on scanning electron microscope (SEM XL 30 ESEM, Philips Netherlands). Refer to FIG. 2 of the accompanying drawings for the scanning electron micrographs of DPE-g-PETA, DPE-g-AA, and DPE-g-MA graft copolymers prepared in accordance with the process of examples 1, 4 and 6 respectively. The SEM of graft copolymers of the present disclosure was also compared with the SEM of virgin DPE (refer to FIG. 1 of the accompanying drawings) and virgin DPEH polymers. The provided FIG. 2 of the accompanying drawings clearly reveals the in-situ formation of strong fibers in case of DPE-g-PETA, DPE-g-AA, DPE-g-MA graft copolymers and in-situ formation of flakes in case of DPE-g-MMA and DPE-g-TEMPTA graft copolymers.

TABLE 1

Nucleating and Morphological properties of DPE-graft-copolymers

| S No | Virgin/Graft copolymers | Tc (° C.) | Tm (° C.) | $\Delta$HTm (J/g) | $\Delta$T (° C.) | C$ (%) | Morphology |
|---|---|---|---|---|---|---|---|
| 1 | DPE | 116 | 148 | 180 | 32 | 62 | Powder |
| 2 | DPEgPETA | 121 | 152 | 178 | 31 | 61 | Fiber |
| 3 | DPEgAA | 119 | 150 | 160 | 31 | 55 | Fiber |
| 4 | DPEgMA | 118 | 147 | 172 | 29 | 59 | Fiber |
| 5 | DPEgMMA | 117 | 147 | 176 | 30 | 60 | Flakes |
| 6 | DPEgTEMPTA | 117 | 147 | 179 | 30 | 61 | Flakes |
| 7 | DPEgPETA# | 116 | 147 | 180 | 31 | 61 | powder |
| 8 | DPEgPETA+ | 116 | 148 | 180 | 32 | 62 | powder |

Reaction carried out in three neck flask under stirring;
$ DSC crystallinity;
+Reaction carried out in a sealed flask without stirring;
DPE—disentangled ultrahigh molecular weight polyethylene (homopolymer)

TABLE 2

Effect of DPE molecular weight on the Nucleating and morphological properties of DPE-g-PETA graft copolymers

| S No | Graft copolymers | MW (Million) | Tc (° C.) | Tm (° C.) | $\Delta$HTm (J/g) | $\Delta$T (° C.) | C$ (%) | Morphology |
|---|---|---|---|---|---|---|---|---|
| 1 | DPEgPETA | 0.3 | 116 | 145 | 168 | 29 | 60 | Fibre |
| 2 | DPEgPETA | 4 | 117 | 146 | 175 | 29 | 60 | Fibre |
| 3 | DPEgPETA | 5 | 121 | 152 | 178 | 31 | 61 | Fibre |
| 4 | DPEgPETA | 9.4 | 117 | 144 | 168 | 27 | 58 | Powder |
| 5 | DPEgPETA | 12.1 | 118 | 145 | 197 | 27 | 68 | Powder |

$ DSC crystallinity

TABLE 3

Effect of PETA concentration on the Nucleating and Morphological properties of DPE-g-PETA graft copolymers.

| S No | PETA Concentration | Tc (° C.) | Tm (° C.) | $\Delta$HTm (J/g) | $\Delta$H (° C.) | C$ (%) | Morphology |
|---|---|---|---|---|---|---|---|
| 1 | DPE | 116 | 148 | 180 | 32 | 62 | Powder |
| 2 | 5 | 121 | 152 | 178 | 31 | 61 | Fibers |
| 3 | 10 | 121 | 152 | 138 | 31 | 47 | Fibers |
| 4 | 15 | 121 | 152 | 130 | 31 | 45 | Fibers |

$ - DSC Crystallinity

TABLE 4

Effect of Acrylic Acid concentration on the Nucleating and Morphological properties of DPE-g-AA graft copolymers

| S No | AA Concentration (%) | Tc (°C.) | Tm1 (°C.) | ΔHTm (J/g) | ΔH (°C.) | C $ (%) | Morphology |
|---|---|---|---|---|---|---|---|
| 1 | DPE | 116 | 148 | 180 | 32 | 62 | Powder |
| 2 | 5 | 119 | 150 | 160 | 31 | 55 | Fibers |
| 3 | 10 | 119 | 151 | 145 | 32 | 50 | Fibers |
| 4 | 15 | 119 | 150 | 143 | 31 | 49 | Fibers |

$ DSC crystallinity

TABLE 5

Nucleating and Morphological properties of DPEH-g-PETA graft copolymers

| S. No. | Virgin/Graft copolymers/ (MW) | Tc (°C.) | Tm (°C.) | ΔHTm (J/g) | Tm − Tc (°C.) | % C$ | Morphology |
|---|---|---|---|---|---|---|---|
| 1 | DPE | 116 | 148 | 180 | 32 | 62 | Powder |
| 2 | DPEH$_{x2}$/ (4.4 million) + | 116 | 142 | 191 | 26 | 66 | Powder |
| 3 | DPEH$_{x2}$-g-PETA | 120 | 147 *(138) | 128 | 27 | 44 | Fibers |
| 4 | DPEH$_{x2}$-g-TEMPTA | 119 | 152 *(137) | 130 | 33 | 45 | Fibers |
| 5 | DPEH$_{x2}$-g-MMA | 117 | 146 | 196 | 29 | 67 | Flakes |
| 6 | DPEH$_{x2}$-g-AA | 117 | 144 | 195 | 27 | 67 | Flakes |
| 7 | DPEH$_{x1}$/ (5.8 million) + | 115 | 144 | 167 | 29 | 57 | Powder |
| 8 | DPEH$_{x1}$-g-PETA | 119 | 149 *(137) | 122 | 30 | 42 | Fibers |
| 9 | DPEH$_{x3}$/ (5 million) + | 115 | 142 | 183 | 27 | 63 | Powder |
| 10 | DPEH$_{x3}$-g-PETA | 116 | 149 *(137) | 103 | 33 | 35 | Fibers |

+ DPE - hexene copolymer with 0.4 wt. % hexene (DPEHx$_2$, 2 wt. % hexene (DPEHx$_1$) & 10 wt. % hexene (DPEHx$_3$).
* Multiple Crystallization peaks
$ - DSC crystallinity

TABLE 6

Thermal stability of virgin DPE, virgin DPEH, DPE grafted copolymers, DPEH-grafted copolymers, virgin EPE and EPE grafted copolymers.

| S No | Virgin/Graft copolymers | Decomposition stage | T$_{50}$ (°C.) | T$_{100}$ (°C.) | DecompositionTemp (°C.)/ Residual Weight (%) | | | |
|---|---|---|---|---|---|---|---|---|
| | | | | | 400 | 450 | 500 | 600 |
| 1 | DPE | Single stage | 436 | 454 | 90 | 13 | 1.3 | 1.0 |
| 2 | DPEgPETA | Single stage | 450 | 474 | 95 | 44 | 1.3 | 1.0 |
| 3 | DPEgAA | Single stage | 440 | 460 | 92 | 21 | 1.8 | 1.7 |
| 4 | DPEgMA | Two stage | 438 | 464 | 85 | 18 | 3.2 | 1.1 |
| 5 | DPEgTEMPTA | Single stage | 439 | 466 | 89 | 22 | 1.0 | 0.4 |
| 6 | DPEgMMA | Single stage | 445 | 466 | 94 | 34 | 1.2 | 1.1 |
| 7 | DPEgMMA/TEMPTA | Multistage | 425 | 570 | 72 | 14 | 6.7 | 1.1 |
| 8 | DPEHgPETA | Single stage | 454 | 470 | 95 | 38 | 0.1 | 0.04 |
| | EPE (REF) | Single stage | 434 | 452 | 92 | 13 | 1.2 | 0.09 |
| | EPEgPETA | Single stage | 448 | 460 | 92 | 20 | 0.5 | 0.18 |

Comparative Example

Solid State Graft Co-Polymerization of Pentaerythritol Triacrylate (PETA) onto Entangled Ultrahigh Molecular Weight Polyethylene (EPE)

Figure 3:
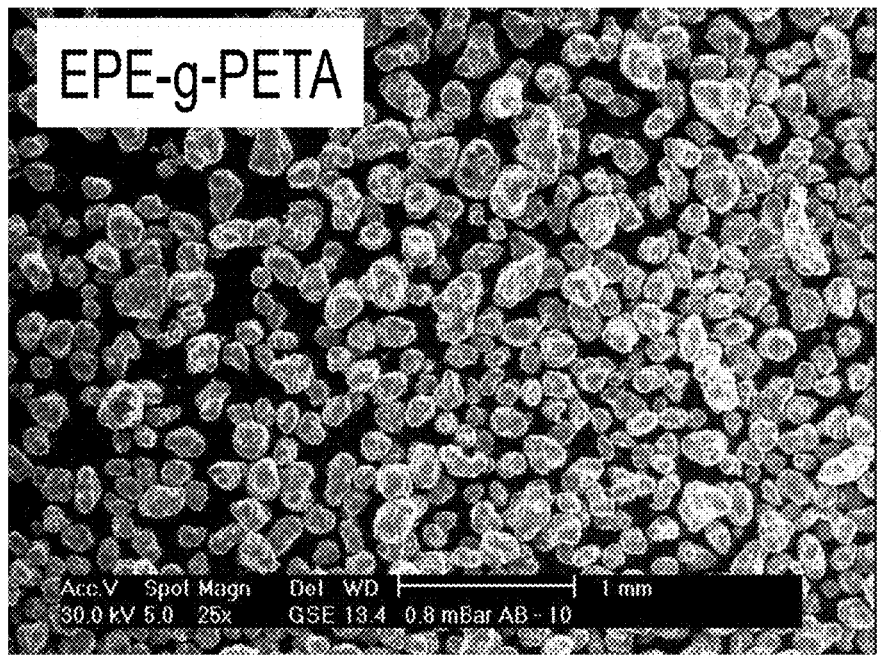
Figure 3:
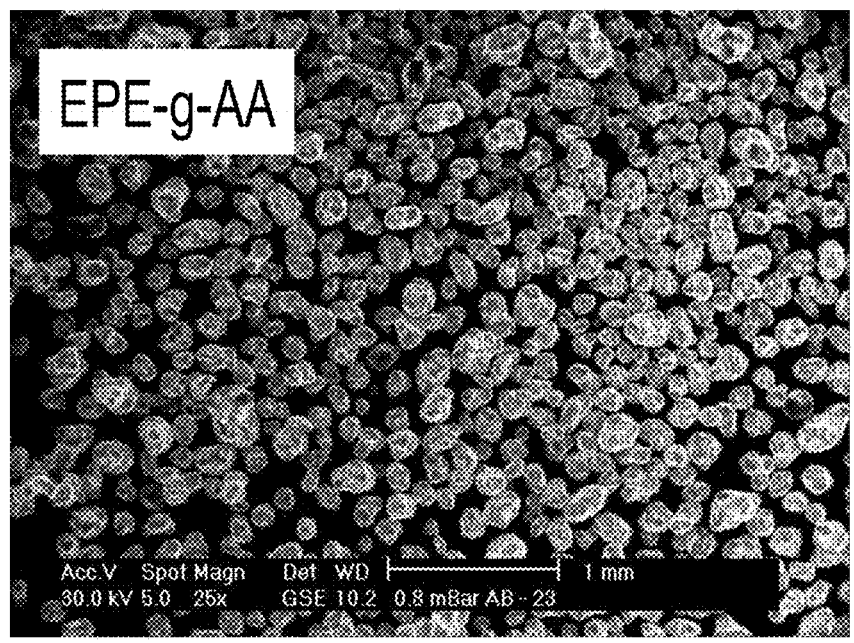
Figure 3:
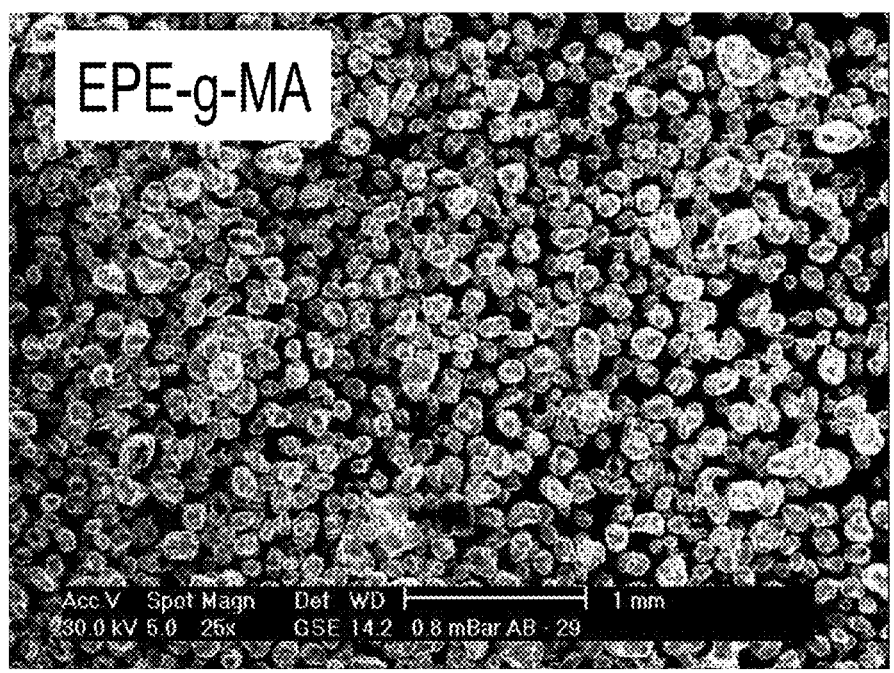

Solid state graft co-polymerization of PETA onto ultrahigh molecular weight polyethylene (EPE) was carried out by admixing PETA monomer and Diacetyl peroxy dicarbonate initiator in a small container, followed by adding a required amount of EPE polymer. All the contents were mixed for 10 min and transferred into mixing head of Brabender Plasticorder. The reaction was carried out in solid phase at 100° C. for 60 min with a screw rpm of 20. After completion of the reaction, the contents were transferred to a container and re-weighed. The un-reacted monomer, its homopolymer and residual free radical initiator were removed by soxhlet extraction using acetone solvent. The extracted graft copolymer (EPE-g-PETA) was dried in a vacuum oven for 2 hrs at 80° C. The extracted graft copolymer (EPE-g-PETA) was further characterized using DSC, TGA and SEM techniques to evaluate its nucleating efficiency, thermal stability (refer to Table 6 and 7) and morphological features. FIG. 3 of the accompanying drawings shows no change in the morphology of the entangled ultrahigh molecular weight polyethylene upon graft co-polymerization thereof.

TABLE 7

Nucleating efficiency and Morphological properties of entangled ultrahigh molecular weight polyethylene (EPE) graft copolymers.

| S No | Virgin/Graft copolymers | Tc (°C.) | Tm (°C.) | ΔHTm (J/g) | ΔT (°C.) | C$ (%) | Morphology |
|---|---|---|---|---|---|---|---|
| 1 | EPE | 116 | 143 | 138 | 26 | 47 | powder |
| 2 | EPEgPETA | 117 | 143 | 130 | 25 | 45 | powder |
| 3 | EPEgAA | 117 | 142 | 148 | 24 | 51 | powder |
| 4 | EPEgMA | 117 | 143 | 148 | 25 | 51 | powder |

$ DSC Crystallinity

Compression Moulding:

Compression moulding of DPE, DPEH and EPE and graft copolymers thereof was done (Darragon 94Ivry, machine, France) by adding 0.02 g of Irganox 1010 (0.4 wt. %) to 5 gm of virgin/grafted copolymers at a temperature below the melting temperature of the polymer (80-128° C.) with variation in pressure and time viz. 0 bar for 30 sec, 50 bar for 1 min, 100 bar for 3 min and 370 bars for 10 min. For comparison, compression moulding was also done at 150° C. i.e. at a temperature higher than the melting point of the polymer & at a pressure of 370 bar for 30 min. After compression moulding, the sample was allowed to cool down for 20 minutes in normal atmosphere.

TECHNICAL ADVANTAGES

The present disclosure related to disentangled ultrahigh molecular weight graft-copolymers and a process for preparation thereof has the following technical advantages:
(1) Improvement in the thermal stability and the nucleating efficiency of disentangled ultrahigh molecular weight polyethylene by graft-copolymerization thereof with acrylic/anhydride based monomers,
(2) In-situ formation of disentangled ultrahigh molecular weight polyethylene graft-copolymer in the form of flakes and fibers,
(3) Use of costly and hazardous solvent is completely obviated during the solid state graft co-polymerization of disentangled ultrahigh molecular weight polyethylene with acrylic/anhydride based monomers, and
(4) Solid state graft co-polymerization is carried out below the melting temperature of disentangled ultrahigh molecular weight polyethylene.

The numerical values mentioned for the various physical parameters, dimensions or quantities are only approximations and it is envisaged that the values higher/lower than the numerical values assigned to the parameters, dimensions or quantities fall within the scope of the invention, unless there is a statement in the specification specific to the contrary The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A process for preparing disentangled ultrahigh molecular weight polyethylene graft copolymers, said process comprising the following steps:
   i. admixing disentangled ultrahigh molecular weight polyethylene, at least one functional monomer and a free radical initiator to obtain a mixture, wherein the disentangled ultrahigh molecular weight polyethylene has a bulk density of 0.0485 g/cc to 0.07 g/cc, and a heat of fusion of 180 J/g to 210 J/g; and
   ii. subjecting the mixture to solid state polymerization to obtain a graft copolymer of disentangled ultrahigh molecular weight polyethylene.

2. The process as claimed in claim 1, wherein the disentangled ultrahigh molecular weight polyethylene is a homopolymer of ethylene or a copolymer of ethylene with other alpha-olefin monomers that comprises at least one alpha-olefin monomer selected from the group consisting of 1-butene, 1-hexene and 1-octene.

3. The process as claimed in claim 1, wherein the disentangled ultrahigh molecular weight polyethylene is used in the form of a powder with an average particle size varying between 220 to 450 micron, having a molar mass ranging between 3 million and 15 million; and a density of 0.965 g/cc.

4. The process as claimed in claim 1, wherein the functional monomer is an acrylic and/or anhydride based monomer selected from the group of compounds consisting of pentaerythritol triacrylate, trimethylolpropane triacrylate, methyl methacrylate, acrylic acid, maleic anhydride and any combinations thereof.

5. The process as claimed in claim 1, wherein the weight proportion of monomer varies between 0.25 wt % to 30 wt % with respect to the total mass of disentangled ultrahigh molecular weight polyethylene.

6. The process as claimed in claim 1, wherein the free radical initiator is at least one selected from the group of compounds consisting of dicumyl peroxide, 2,5-dimethyl-2,5-di(tert-butylperoxy)hexane and diacetyl peroxy dicarbonate.

7. The process as claimed in claim 1, wherein the amount of free radical initiator varies between 0.5 to 500 ppm.

8. The process as claimed in claim 1, wherein the solid state polymerization is carried out in the mixing head of a blending machine under shear in between screws with the screw rpm of less than 30, for a time period ranging between 5 min to 150 minutes.

9. The process as claimed in claim 1, wherein the mixture is heated to a temperature ranging between 30° C. to 150° C.

10. The process as claimed in claim 1, wherein the graft copolymers are obtained in the form of fibers and flakes.

11. The process as claimed in claim 1, wherein said graft co-polymers are characterized by a crystallization temperature of at least 117° C. and a decomposition temperature ($T_{100}$) ranging between 460° C. to 480° C.

12. The process as claimed in claim 1, wherein the weight proportion of monomer varies between 2.5 wt % to 20 wt % with respect to the total mass of disentangled ultrahigh molecular weight polyethylene.

13. The process as claimed in claim 1, wherein the amount of free radical initiator varies between 0.5 to 200 ppm.

14. The process as claimed in claim 1, wherein the mixture is heated to a temperature ranging between 40° C. to 100° C.

* * * * *